(12) United States Patent
Ogasawara et al.

(10) Patent No.: US 11,394,038 B2
(45) Date of Patent: Jul. 19, 2022

(54) ELECTROCHEMICAL CELL AND CELL STACK DEVICE

(71) Applicant: NGK INSULATORS, LTD., Nagoya (JP)

(72) Inventors: Noriyuki Ogasawara, Nagoya (JP); Hirofumi Kan, Nagoya (JP); Makoto Ohmori, Nagoya (JP); Takashi Ryu, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 277 days.

(21) Appl. No.: 16/593,291

(22) Filed: Oct. 4, 2019

(65) Prior Publication Data

US 2020/0036015 A1    Jan. 30, 2020

Related U.S. Application Data

(63) Continuation of application No. PCT/JP2019/021570, filed on May 30, 2019.

(30) Foreign Application Priority Data

Jul. 12, 2018    (JP) .............................. JP2018-132677

(51) Int. Cl.
*H01M 8/0258* (2016.01)
*H01M 8/026* (2016.01)
(Continued)

(52) U.S. Cl.
CPC ....... *H01M 8/0258* (2013.01); *H01M 8/2484* (2016.02); *H01M 2008/1293* (2013.01)

(58) Field of Classification Search
CPC ........... H01M 8/0258; H01M 8/02484; H01M 8/026; H01M 8/0265; H01M 8/2484
See application file for complete search history.

(56) References Cited

U.S. PATENT DOCUMENTS

| 5,786,105 A | 7/1998 | Matsushima et al. |
| 10,727,524 B2 | 7/2020 | Ogasawara et al. |

(Continued)

FOREIGN PATENT DOCUMENTS

| JP | 09-102323 A | 4/1997 |
| JP | 2012-043779 A | 3/2012 |

(Continued)

OTHER PUBLICATIONS

Japanese language International Search Report and Written Opinion for PCT/JP2019/021570, dated Jul. 16, 2019 (10 pages).

(Continued)

*Primary Examiner* — James Lee
(74) *Attorney, Agent, or Firm* — Flynn Thiel, P.C.

(57) ABSTRACT

An electrochemical cell includes a porous support substrate and a power generation element portion. The support substrate includes at least one first gas channel and at least one second gas channel. The first gas channel extends from a first end portion toward a second end portion and is connected to a gas supply chamber. The second gas channel is connected to the first gas channel on the second end portion side. The second gas channel extends from the second end portion toward the first end portion and is connected to a gas collection chamber. A ratio (p0/L) of a pitch p0 of a first gas channel and a second gas channel that are adjacent to each other to a distance L between the power generation element portion and a first end surface of the support substrate located on the first end portion side is 3.3 or less.

9 Claims, 9 Drawing Sheets

(51) Int. Cl.
  *H01M 8/0265* (2016.01)
  *H01M 8/2484* (2016.01)
  *H01M 8/12* (2016.01)

(56) References Cited

U.S. PATENT DOCUMENTS

| | | |
|---|---|---|
| 10,862,138 B2 | 12/2020 | Ogasawara et al. |
| 2017/0141426 A1 | 5/2017 | Ohmori |
| 2020/0067124 A1 | 2/2020 | Ogasawara et al. |
| 2020/0083554 A1 | 3/2020 | Ogasawara et al. |
| 2021/0043962 A1 | 2/2021 | Ogasawara et al. |

FOREIGN PATENT DOCUMENTS

| | | |
|---|---|---|
| JP | 2015-053186 A | 3/2015 |
| JP | 2016-171064 A | 9/2016 |
| JP | 2017-017023 A | 1/2017 |

OTHER PUBLICATIONS

English Translation of the International Preliminary Report on Patentability, issued in corresponding International Application No. PCT/JP2019/021570 dated Jan. 21, 2021 (8 pages).

English language International Search Report for corresponding application No. PCT/JP2019/008138, dated May 14, 2019 (2 pages).

ELECTROCHEMICAL CELL AND CELL STACK DEVICE

CROSS-REFERENCE TO RELATED APPLICATIONS

This is a continuation of PCT/JP2019/021570, filed May 30, 2019, which claims priority to Japanese Application No. 2018-132677, filed Jul. 12, 2018, the entire contents of which are hereby incorporated by reference.

TECHNICAL FIELD

The present invention relates to an electrochemical cell and a cell stack device.

BACKGROUND ART

A cell stack device including an electrochemical cell and a manifold for supplying gas to the electrochemical cell is known. The electrochemical cell includes a support substrate provided with a gas channel and a power generation element portion supported by the support substrate. Supply gas is supplied from a first end portion of the support substrate to the gas channel, whereas unreacted gas is ejected from a second end portion of the support substrate to the outside.

CITATION LIST

Patent Literature

Patent Literature 1: JP 2016-171064A

SUMMARY

Technical Problem

There is a demand for an improvement in the efficiency of gas usage in an electrochemical cell and a cell stack device as described above. In view of this, the present invention aims to provide an electrochemical cell and a cell stack device capable of improving the efficiency of gas usage.

Solution to Problem

An electrochemical cell according to a first aspect of the present invention is configured to be linked to a gas supply portion and a gas collection portion. The electrochemical cell includes a porous support substrate and a power generation element portion. The support substrate has a flat shape. The support substrate includes a first end portion that is configured to be linked to the gas supply portion and the gas collection portion, and a second end portion that is located opposite to the first end portion. The power generation element portion is disposed on a main surface of the support substrate. The support substrate includes at least one first gas channel and at least one second gas channel. The first gas channel extends from the first end portion toward the second end portion. Also, the first gas channel is configured to be connected to the gas supply portion. The second gas channel is connected to the first gas channel on the second end portion side. The second gas channel extends from the second end portion toward the first end portion. The second gas channel is configured to be connected to the gas collection portion. A ratio ($p0/L$) of the pitch $p0$ of a first gas channel and a second gas channel that are adjacent to each other to a distance $L$ between the power generation element portion and a first end surface of the support substrate located on the first end portion side is 3.3 or less.

With this configuration, unreacted gas in the gas that has flowed through the first gas channel flows through the second gas channel, and unreacted gas in the gas that has flowed through the second gas channel is collected in the gas collection chamber of a gas manifold. Thus, it is possible to improve the efficiency of gas usage.

Also, if the electrochemical cell configured as described above is used as a solid oxide fuel cell (SOFC), it is possible to obtain effects such as the following. In a system in which gas collected in a gas collection chamber is burned with the use of a gas burner simply in the solid oxide fuel cell, there is a risk that a flame failure will occur in a case where the solid oxide fuel cell instantaneously has a fuel gas utilization rate of 100%. In contrast, with the electrochemical cell configured to have a ratio ($p0/L$) of 3.3 or less as described above, unreacted gas before reaching the power generation element portion flows through the support substrate from the first gas channel to the second gas channel, and thus the unreacted gas can be burned with use of the gas burner. As a result, it is possible to inhibit the occurrence of flame failure.

Preferably, the above-described ratio ($p0/L$) is 0.02 or more.

Preferably, the at least one first gas channel includes a plurality of first gas channels. Also, the pitch $p0$ of the first gas channel and the second gas channel that are adjacent to each other is larger than a pitch $p1$ of first gas channels that are adjacent to each other.

Preferably, the at least one second gas channel includes a plurality of second gas channels. Also, the pitch $p0$ of the first gas channel and the second gas channel that are adjacent to each other is larger than a pitch $p2$ of second gas channels that are adjacent to each other.

Preferably, the support substrate further includes a connection channel for connecting the first gas channel and the second gas channel in the second end portion.

Preferably, the electrochemical cell further includes a connection member. The connection member includes a connection channel for connecting the first gas channel and the second gas channel. The connection member is attached to the second end portion of the support substrate.

Preferably, the at least one first gas channel includes a plurality of first gas channels. Also, the at least one second gas channel includes a plurality of second gas channels. Also, the number of connection channels is only one.

Preferably, the pitch $p0$ of the first gas channel and the second gas channel that are adjacent to each other is larger than a distance $T$ between a first gas channel and the power generation element portion.

A cell stack device according to a second aspect of the present invention includes any of the above-described electrochemical cells and a manifold configured to support the first end portion of the support substrate. The manifold includes a gas supply chamber that is connected to the first gas channel and a gas collection chamber that is connected to the second gas channel.

Advantageous Effects

According to the present invention, it is possible to improve the efficiency of gas usage.

DESCRIPTION OF EMBODIMENTS

Figure 1:
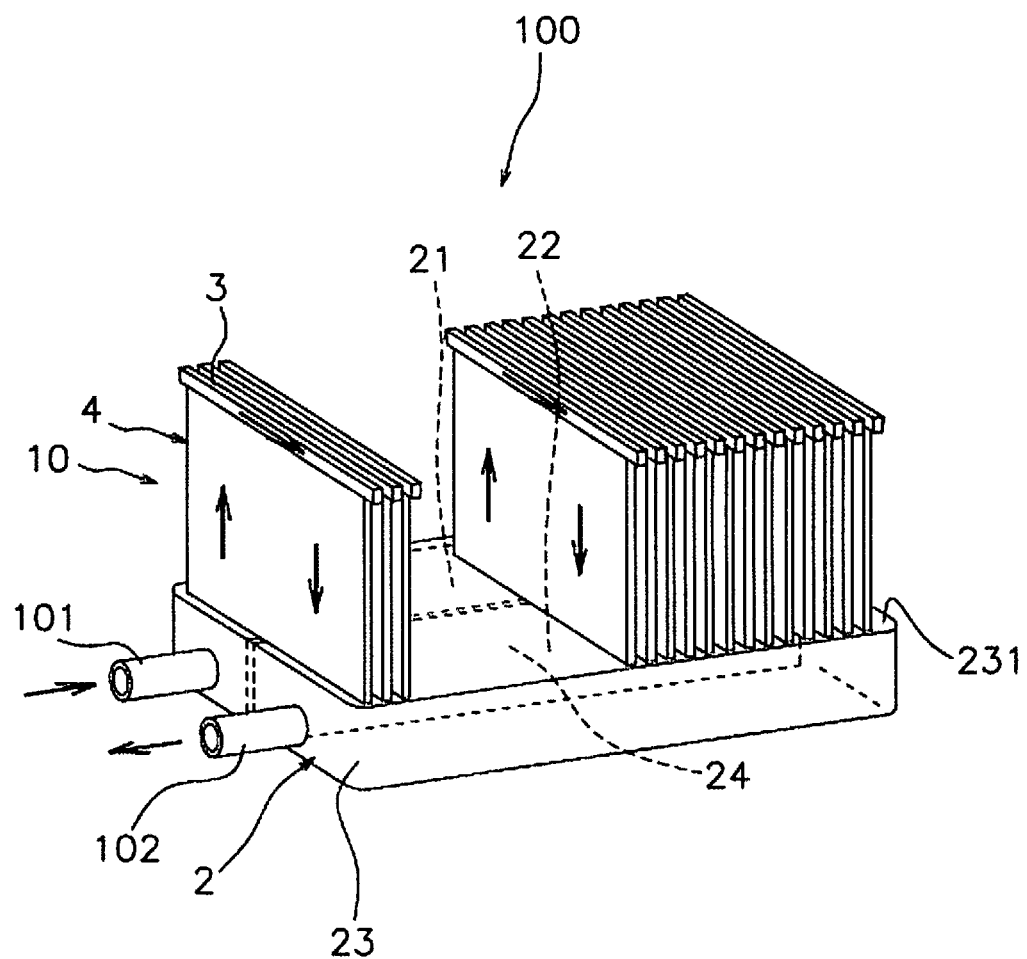
FIG. 1 is a perspective view of a cell stack device.

Hereinafter, embodiments of an electrochemical cell and a cell stack device according to the present invention will be described with reference to the drawings. Note that this embodiment will be described using, as one example of an electrochemical cell, a fuel cell, more specifically, a solid oxide fuel cell (SOFC). FIG. 1 is a perspective view showing a cell stack device. Note that some fuel cells are not shown in FIG. 1.

Cell Stack Device

As shown in FIG. 1, a cell stack device 100 includes a manifold 2 and a plurality of fuel cells 10.

Manifold

The manifold 2 is configured to supply gas to the fuel cells 10. Also, the manifold 2 is configured to collect gas ejected from the fuel cells 10. The manifold 2 includes a gas supply chamber 21 (one example of a gas supply portion) and a gas collection chamber 22 (one example of a gas collection portion). A gas supply pipe 101 is connected to the gas supply chamber 21, and a gas collection pipe 102 is connected to the gas collection chamber 22. Fuel gas is supplied to the gas supply chamber 21 through the gas supply pipe 101. Also, fuel gas in the gas collection chamber 22 is collected from the manifold 2 through the gas collection pipe 102.

The manifold 2 includes a manifold main body 23 and a partition plate 24. The manifold main body 23 has an internal space. The manifold main body 23 has a rectangular parallelepiped shape.

Figure 2:
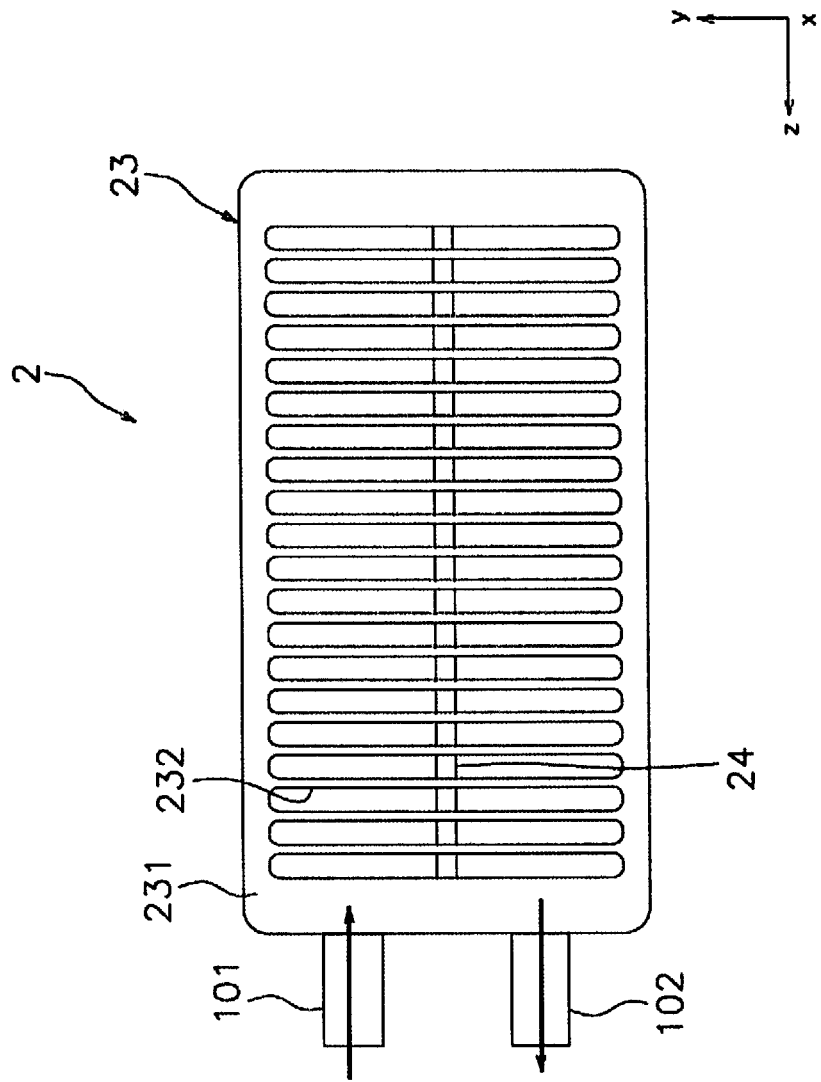
FIG. 2 is a plan view of a manifold.

As shown in FIG. 2, an upper plate portion 231 of the manifold main body 23 is provided with a plurality of through holes 232. The through holes 232 are arranged at intervals in a length direction (the Z-axis direction) of the manifold main body 23. The through holes 232 extend in a width direction (the Y-axis direction) of the manifold main body 23. The through holes 232 are in communication with the gas supply chamber 21 and the gas collection chamber 22. Note that each through hole 232 may be divided into a portion that is in communication with the gas supply chamber 21 and a portion that is in communication with the gas collection chamber 22.

The partition plate 24 partitions the space of the manifold main body 23 into the gas supply chamber 21 and the gas collection chamber 22. Specifically, the partition plate 24 extends in the length direction of the manifold main body 23 at a substantially central portion of the manifold main body 23. The partition plate 24 needs not completely partition the space of the manifold main body 23, and a gap may be formed between the partition plate 24 and the manifold main body 23.

Fuel Cell

The fuel cells 10 extend upward from the manifold 2. Specifically, lower end portions of the fuel cells 10 are attached to the manifold 2. The fuel cells 10 are arranged such that main surfaces of the fuel cells 10 face each other. Also, the fuel cells 10 are arranged at intervals in the length direction of the manifold 2. That is, an arrangement direction of the fuel cells 10 is along the length direction of the manifold 2. Note that the fuel cells 10 need not be disposed at equal intervals in the length direction of the manifold 2.

Figure 3:
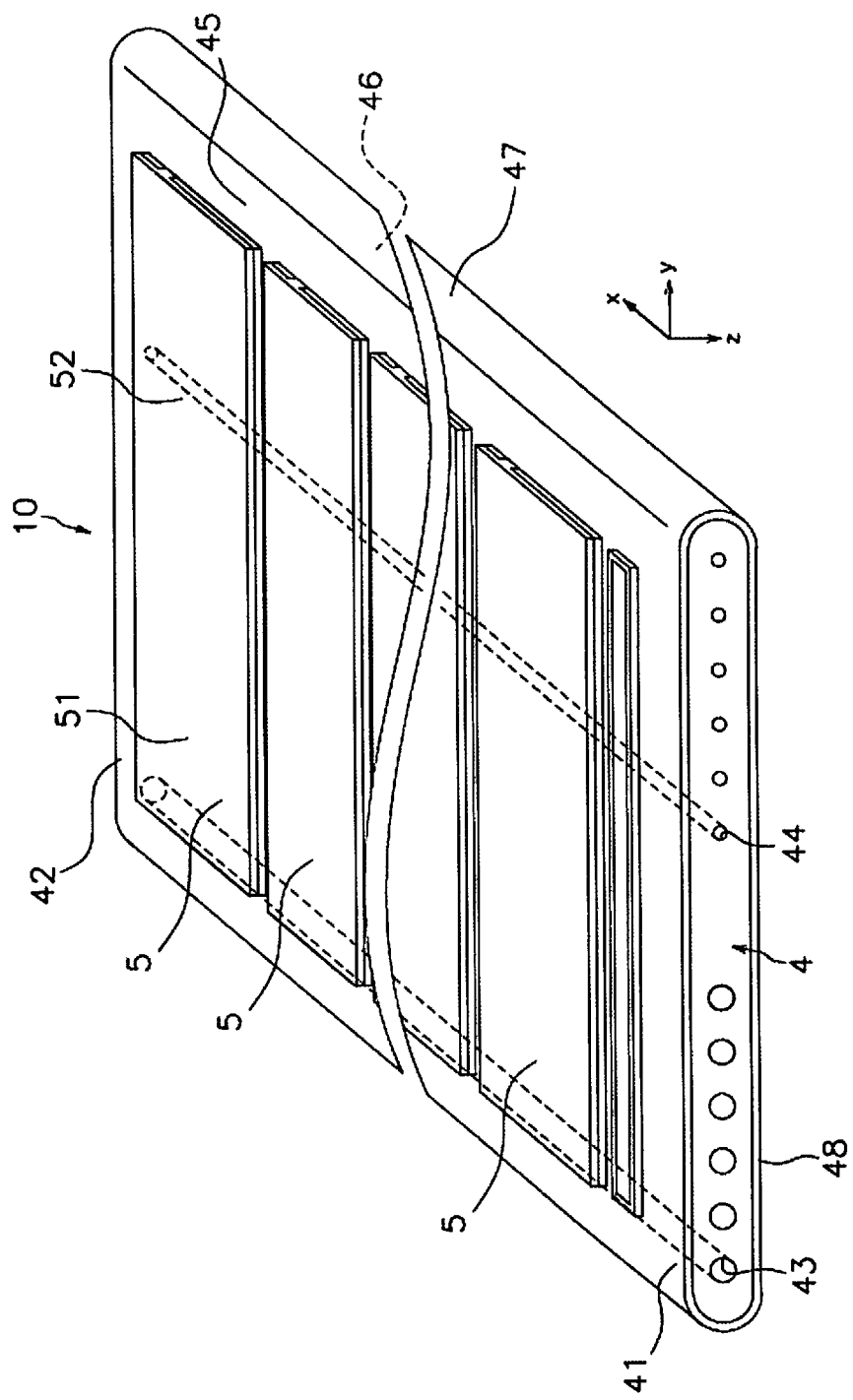
FIG. 3 is a perspective view of a fuel cell.
Figure 4:
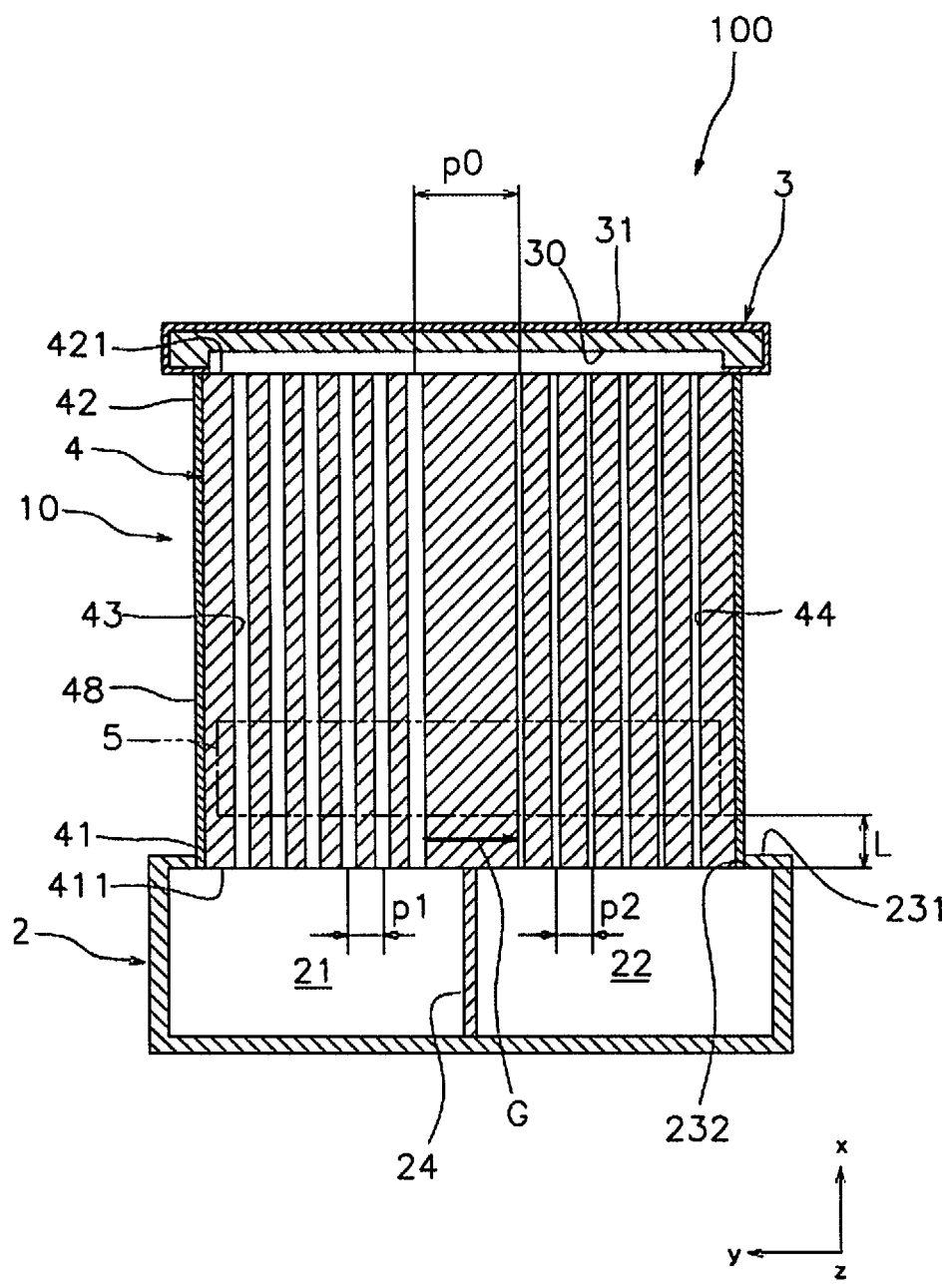
FIG. 4 is a cross-sectional view of the cell stack device.

As shown in FIGS. 3 and 4, the fuel cells 10 each include a support substrate 4, a plurality of power generation element portions 5, and a connection member 3. The power generation element portions 5 are supported on a first main surface 45 and a second main surface 46 of the support substrate 4. Note that the number of power generation element portions 5 formed on the first main surface 45 and the number of power generation element portions 5 formed on the second main surface 46 may be the same or different from each other. Also, the power generation element portions 5 may have different sizes.

Support Substrate

The support substrate 4 extends from the manifold 2 in the vertical direction. Specifically, the support substrate 4 extends upward from the manifold 2. The support substrate 4 has a flat shape and has a first end portion 41 and a second end portion 42. The first end portion 41 and the second end portion 42 are both end portions of the support substrate 4 in the length direction (the X-axis direction).

The first end portion 41 of the support substrate 4 is attached to the manifold 2. For example, the first end portion 41 of the support substrate 4 is attached to the upper plate portion 231 of the manifold 2 with the use of a bonding material or the like. Specifically, the first end portion 41 of the support substrate 4 is inserted into the through hole 232 formed in the upper plate portion 231. Note that the first end portion 41 of the support substrate 4 need not be inserted into the through hole 232. As a result of the first end portion 41 of the support substrate 4 being attached to the manifold 2 in this manner, the first end portion 41 of the support substrate 4 is linked to the gas supply chamber 21 and the gas collection chamber 22.

The support substrate 4 includes a plurality of first gas channels 43 and a plurality of second gas channels 44. The first gas channels 43 extend in the vertical direction in the support substrate 4. That is, the first gas channels 43 extend in the length direction (the X-axis direction) of the support substrate 4. The first gas channels 43 pass through the support substrate 4. The first gas channels 43 are disposed at intervals in the width direction (the Y-axis direction) of the support substrate 4. Note that the first gas channels 43 are preferably disposed at equal intervals. The length of the support substrate 4 in the width direction (the Y-axis direction) may be longer than the length of the support substrate 4 in the length direction (the X-axis direction).

As shown in FIG. 4, a pitch p1 of adjacent first gas channels 43 is about 1 to 5 mm, for example. The pitch p1 of adjacent first gas channels 43 indicates the distance between centers of the first gas channels 43. For example, an average value of pitches obtained by measuring pitches of first gas channels 43 in the first end portion 41, the central portion, and the second end portion 42 may be used as the pitch p1 of first gas channels 43.

The first gas channels 43 extend from the first end portion 41 of the support substrate 4 to the second end portion 42 of the support substrate 4. The first gas channels 43 are connected to the gas supply chamber 21 on the first end portion 41 side in a state in which the fuel cell 10 is attached to the manifold 2.

The second gas channels 44 extend in the vertical direction in the support substrate 4. That is, the second gas channels 44 extend in the length direction (the X-axis direction) of the support substrate 4. The second gas channels 44 extend substantially in parallel to the first gas channels 43.

The second gas channels 44 pass through the support substrate 4. The second gas channels 44 are disposed at intervals in the width direction (the Y-axis direction) of the support substrate 4. Note that the second gas channels 44 are preferably disposed at equal intervals.

A pitch p2 of adjacent second gas channels 44 is about 1 to 5 mm, for example. The pitch p2 of adjacent second gas channels 44 indicates the distance between centers of the second gas channels 44. For example, an average value of pitches obtained by measuring pitches of second gas channels 44 in the first end portion 41, the central portion, and the second end portion 42 may be used as the pitch p2 of second gas channels 44. Note that the pitch p2 between second gas channels 44 is preferably substantially equal to the pitch p1 between first gas channels 43.

The second gas channels 44 extend from the second end portion 42 of the support substrate 4 to the first end portion 41 of the support substrate 4. The second gas channels 44 are connected to the gas collection chamber 22 of the manifold 2 on the first end portion 41 side in a state in which the fuel cell 10 is attached to the manifold 2.

A pitch p0 of a first gas channel 43 and a second gas channel 44 that are adjacent to each other is about 1 to 10 mm, for example. The pitch p0 of the first gas channel 43 and the second gas channel 44 that are adjacent to each other indicates the distance between the center of the first gas channel 43 and the center of the second gas channel 44. For example, the pitch p0 can be measured on a first end surface 411 of the support substrate 4.

The pitch p0 of the first gas channel 43 and the second gas channel 44 that are adjacent to each other is larger than the pitch p1 of first gas channels 43 that are adjacent to each other. Also, the pitch p0 of the first gas channel 43 and the second gas channel 44 that are adjacent to each other is larger than the pitch p2 of second gas channels 44 that are adjacent to each other.

The first gas channels 43 and the second gas channels 44 are connected to each other on the second end portion 42 side of the support substrate 4. Specifically, the first gas channels 43 and the second gas channels 44 are connected to each other via a connection channel 30 of the connection member 3.

The first gas channels 43 and the second gas channels 44 are configured such that a pressure loss of gas in the first gas channels 43 is smaller than a pressure loss of gas in the second gas channels 44. Note that, as in this embodiment, if a plurality of first gas channels 43 and a plurality of second gas channels 44 are present, the first gas channels 43 and the second gas channels 44 are configured such that an average value of pressure losses of gas in the first gas channels 43 is smaller than an average value of pressure losses of gas in the second gas channels 44.

For example, the flow channel cross-sectional area of each first gas channel 43 can be larger than the flow channel cross-sectional area of each second gas channel 44. Note that, if the number of first gas channels 43 is different from the number of second gas channels 44, the sum of the flow channel cross-sectional areas of the first gas channels 43 can be larger than the sum of the flow channel cross-sectional areas of the second gas channels 44.

The sum of the flow channel cross-sectional areas of the second gas channels 44, although not particularly limited, may be set to about 20% to 95% of the sum of the flow channel cross-sectional areas of the first gas channels 43. Note that the flow channel cross-sectional area of the first gas channel 43 may be set to about 0.5 to 20 mm$^2$, for example. Also, the flow channel cross-sectional area of the second gas channel 44 may be set to about 0.1 to 15 mm$^2$, for example.

Note that the flow channel cross-sectional area of the first gas channel 43 refers to the flow channel cross-sectional area of the first gas channel 43 on the cross-section obtained by cutting the first gas channel 43 along a plane (the YZ plane) orthogonal to a direction (the X-axis direction) in which the first gas channel 43 extends. Also, an average value of the flow channel cross-sectional area at any position on the first end portion 41 side, the flow channel cross-sectional area at any position of the central portion, and the flow channel cross-sectional area at any position on the second end portion 42 side can be used as the flow channel cross-sectional area of the first gas channel 43.

Also, the flow channel cross-sectional area of the second gas channel 44 refers to the flow channel cross-sectional area of the second gas channel 44 on the cross-section obtained by cutting the second gas channel 44 along a plane (the YZ plane) orthogonal to a direction (the X-axis direction) in which the second gas channel 44 extends. Also, an average value of the flow channel cross-sectional area at any position on the first end portion 41 side, the flow channel cross-sectional area at any position of the central portion, and the flow channel cross-sectional area at any position on the second end portion 42 side can be used as the flow channel cross-sectional area of the second gas channel 44.

As shown in FIG. 3, the support substrate 4 includes a first main surface 45 and a second main surface 46. The first main surface 45 and the second main surface 46 face away from each other. The first main surface 45 and the second main surface 46 support the power generation element portions 5. The first main surface 45 and the second main surface 46 are oriented in the thickness direction (the Z-axis direction) of the support substrate 4. Also, side surfaces 47 of the support substrate 4 are oriented in the width direction (the Y-axis direction) of the support substrates 4. The side surfaces 47 may be curved. As shown in FIG. 1, the support substrates 4 are disposed such that the first main surfaces 45 and the second main surfaces 46 face each other.

As shown in FIG. 3, the support substrate 4 supports power generation element portions 5. The support substrate 4 is constituted by a porous material having no electron conductivity. The support substrate 4 is constituted by CSZ (calcia stabilized zirconia), for example. Alternatively, the support substrate 4 may be constituted by NiO (nickel oxide) and YSZ (8YSZ) (yttria-stabilized zirconia), NiO (nickel oxide) and $Y_2O_3$ (yttria), or MgO (magnesium oxide) and $MgAl_2O_4$ (magnesia alumina spinel). The support substrate 4 has a porosity of about 20% to 60%, for example. The porosity is measured using the Archimedes' method, or through microstructure observation, for example.

The support substrate 4 is covered by a compact layer 48. The compact layer 48 is configured to keep gas that is diffused from the first gas channels 43 and the second gas channels 44 into the support substrate 4 from being ejected to the outside. In this embodiment, the compact layer 48 covers the first main surface 45, the second main surface 46, and the side surfaces 47 of the support substrate 4. Note that, in this embodiment, the compact layer 48 is constituted by electrolytes 7 and interconnectors 91, which will be described later. The compact layer 48 is more compact than the support substrate 4. For example, the compact layer 48 has a porosity of about 0% to 7%.

Power Generation Element Portion

The plurality of power generation element portions 5 are supported on the first main surface 45 and the second main surface 46 of the support substrate 4. The power generation element portions 5 are arranged in the length direction (the X-axis direction) of the support substrate 4. Specifically, the power generation element portions 5 are disposed at intervals from the first end portion 41 to the second end portion 42 on the support substrate 4. That is, the power generation element portions 5 are disposed at intervals in the length direction (the X-axis direction) of the support substrate 4. Note that the power generation element portions 5 are connected to each other in series by electrical connection portions 9, which will be described later.

The power generation element portions 5 each extend in the width direction (the Y-axis direction) of the support substrate 4. The power generation element portion 5 is divided into a first portion 51 and a second portion 52 in the width direction of the support substrate 4. Note that there is no strict boundary between the first portion 51 and the second portion 52. For example, in a state in which the fuel cells 10 are attached to the manifold 2, in a longitudinal view (the X-axis view) of the support substrate 4, a portion overlapping the boundary between the gas supply chamber 21 and the gas collection chamber 22 can be referred to as a boundary portion between the first portion 51 and the second portion 52.

In the thickness view (the Z-axis view) of the support substrate 4, the first gas channels 43 overlap the first portions 51 of the power generation element portions 5. Also, in the thickness view (the Z-axis view) of the support substrate 4, the second gas channels 44 overlap the second portions 52 of the power generation element portions 5. Note that some of the first gas channels 43 need not overlap the first portions 51. Similarly, some of the second gas channels 44 need not overlap the second portions 52.

Figure 5:
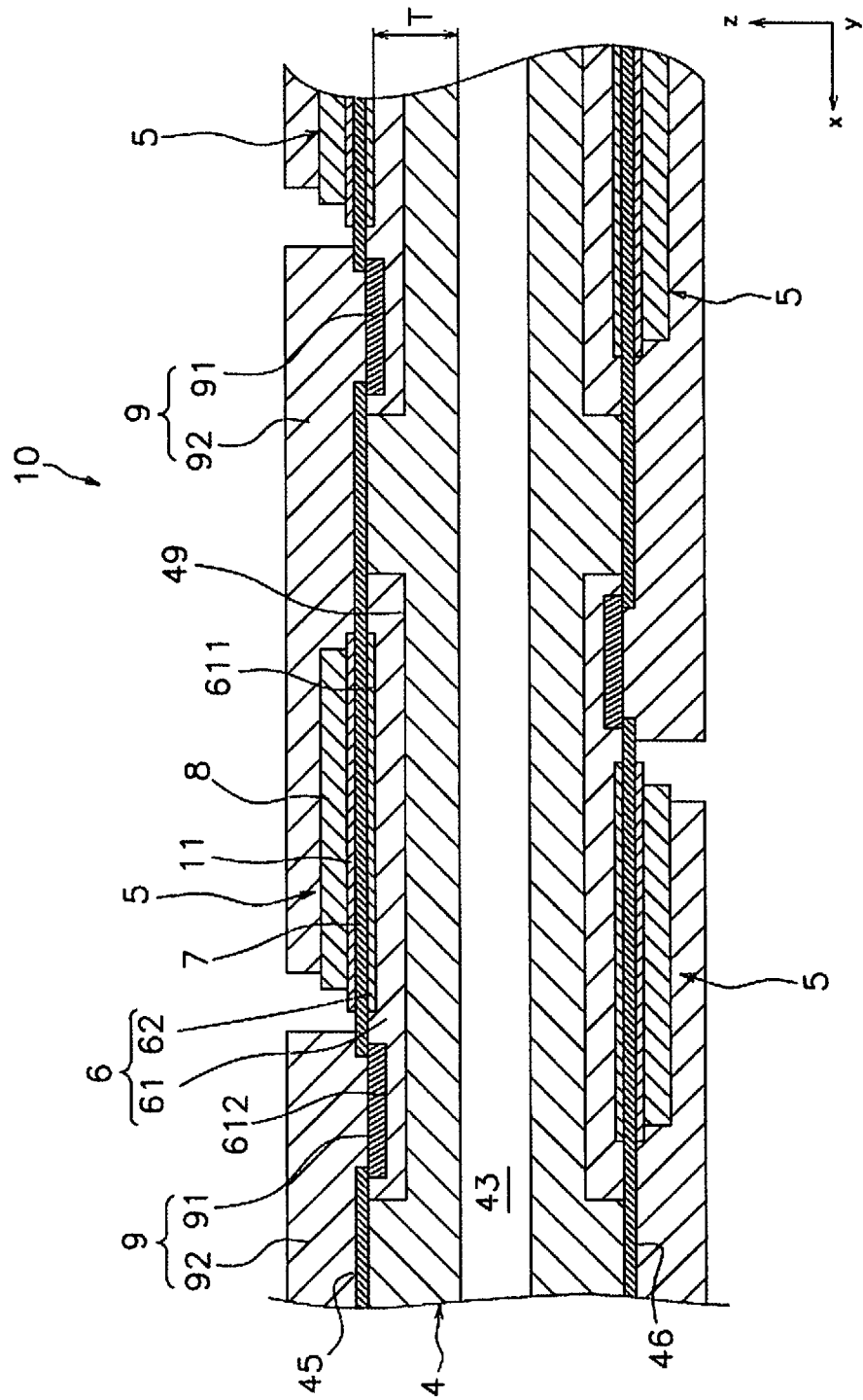
FIG. 5 is a cross-sectional view of the fuel cell.

FIG. 5 is a cross-sectional view of the fuel cell 10 cut along the first gas channel 43. Note that the cross-sectional view of the fuel cell 10 cut along the second gas channel 44 is the same as that in FIG. 5, except that the flow channel cross-sectional area of the second gas channel 44 is different from that in FIG. 5.

The power generation element portions 5 include fuel electrodes 6, the electrolytes 7, and air electrodes 8. Also, the power generation element portions 5 further include reaction preventing films 11. The fuel electrode 6 is a sintered body constituted by a conductive porous material. The fuel electrode 6 includes a fuel electrode current collector portion 61 and a fuel electrode active portion 62.

The fuel electrode current collector portion 61 is disposed in a recess 49. The recess 49 is formed in the support substrate 4. Specifically, the recess 49 is filled with the fuel electrode current collector portion 61, and the fuel electrode current collector portion 61 has the same outer shape as the recess 49. The fuel electrode current collector portions 61 each have a first recess 611 and a second recess 612. The fuel electrode active portion 62 is disposed in the first recess 611. Specifically, the first recess 611 is filled with the fuel electrode active portion 62.

The fuel electrode current collector portion 61 may be constituted by NiO (nickel oxide) and YSZ (8YSZ) (yttria-stabilized zirconia), for example. Alternatively, the fuel electrode current collector portion 61 may also be constituted by NiO (nickel oxide) and $Y_2O_3$ (yttria), or NiO (nickel oxide) and CSZ (calcia stabilized zirconia). The fuel electrode current collector portion 61 has a thickness of about 50 to 500 μm and the recess 49 have a depth of about 50 to 500 μm.

The fuel electrode active portion 62 may be constituted by NiO (nickel oxide) and YSZ (8YSZ) (yttria-stabilized zirconia), for example. Alternatively, the fuel electrode active portion 62 may also be constituted by NiO (nickel oxide) and GDC (gadolinium doped ceria). The fuel electrode active portion 62 has a thickness of 5 to 30 μm.

The electrolyte 7 is disposed covering the fuel electrode 6. Specifically, the electrolyte 7 extends in the length direction from one interconnector 91 to another interconnector 91. That is, the electrolytes 7 and the interconnectors 91 are disposed in an alternating manner in the length direction (the X-axis direction) of the support substrate 4. Also, the electrolytes 7 cover the first main surface 45, the second main surface 46, and the side surfaces 47 of the support substrate 4.

The electrolyte 7 is more compact than the support substrate 4. For example, the electrolyte 7 has a porosity of about 0% to 7%. The electrolyte 7 is a sintered body constituted by a compact material having ionic conductivity and no electron conductivity. The electrolyte 7 may be constituted by YSZ (8YSZ) (yttria-stabilized zirconia), for example. Alternatively, the electrolyte 7 may also be constituted by LSGM (lanthanum gallate). The electrolyte 7 has a thickness of about 3 to 50 μm, for example.

The reaction preventing film 11 is a sintered body constituted by a compact material. The reaction preventing film 11 has a shape that is substantially the same as that of the fuel electrode active portion 62, in a plan view. The reaction preventing film 11 is disposed at a position corresponding to the fuel electrode active portion 62 via the electrolyte 7. The reaction preventing film 11 is provided in order to suppress the occurrence of a phenomenon in which a reaction layer with a large electric resistance is formed at an interface between the electrolyte 7 and the air electrode 8 through a reaction between YSZ in the electrolyte 7 and Sr in the air electrode 8. The reaction preventing film 11 may be constituted by GDC=(Ce, Gd) $O_2$ (gadolinium doped ceria), for example. The reaction preventing film 11 has a thickness of about 3 to 50 μm, for example.

The air electrode 8 is disposed on the reaction preventing film 11. The air electrode 8 is a sintered body constituted by a conductive porous material. The air electrode 8 may be constituted by LSCF=(La, Sr) (Co, Fe)$O_3$ (lanthanum strontium cobalt ferrite), for example. Alternatively, the air electrode 8 may also be constituted by LSF=(La, Sr)FeO$_3$ (lanthanum strontium ferrite), LNF=La (Ni, Fe)O$_3$ (lanthanum nickel ferrite), LSC=(La, Sr)CoO$_3$ (lanthanum strontium cobaltite), or the like. Also, the air electrode 8 may be constituted by two layers of a first layer (inner layer) constituted by LSCF and a second layer (outer layer) constituted by LSC. The air electrode 8 has a thickness of 10 to 100 μm, for example.

Electrical Connection Portion

An electrical connection portion 9 is configured to electrically connect adjacent power generation element portions 5. The electrical connection portion 9 includes an interconnector 91 and an air electrode current collector film 92. The interconnector 91 is disposed in the second recess 612. Specifically, the interconnector 91 is embedded in the second recess 612 (the second recess 612 is filled with the interconnector 91). The interconnector 91 is a sintered body constituted by a conductive compact material. The interconnector 91 is more compact than the support substrate 4. For example, the interconnector 91 has a porosity of about 0% to 7%. The interconnector 91 may be constituted by LaCrO$_3$ (lanthanum chromite), for example. Alternatively, the interconnector 91 may also be constituted by (Sr, La)TiO$_3$ (strontium titanate). The interconnector 91 has a thickness of 10 to 100 μm, for example.

The air electrode current collector film 92 is disposed to extend between the interconnector 91 and the air electrode 8 of adjacent power generation element portions 5. For example, the air electrode current collector film 92 is disposed such that the air electrode 8 of the power generation element portion 5 disposed on the left side in FIG. 5 and the interconnector 91 of the power generation element portion 5 disposed on the right side in FIG. 5 are electrically connected to each other. The air electrode current collector film 92 is a sintered body constituted by a conductive porous material.

The air electrode current collector film 92 may be constituted by LSCF=(La, Sr) (Co, Fe)O$_3$ (lanthanum strontium cobalt ferrite), for example. Alternatively, the air electrode current collector film 92 may also be constituted by LSO=(La, Sr)CoO$_3$ (lanthanum strontium cobaltite). Alternatively, the air electrode current collector film 92 may also be constituted by Ag (silver) or Ag—Pd (a silver palladium alloy). The air electrode current collector film 92 has a thickness of about 50 to 500 μm, for example.

Connection Member

As shown in FIG. 4, the connection member 3 is attached to the second end portion 42 of the support substrate 4. Also, the connection member 3 includes a connection channel 30 for connecting the first gas channels 43 and the second gas channels 44. Specifically, the connection channel 30 connects the first gas channels 43 and the second gas channels 44. The connection channel 30 is constituted by a space extending from the first gas channels 43 to the second gas channels 44. The connection member 3 is preferably joined to the support substrate 4. Also, the connection member 3 is preferably formed as a single body with the support substrate 4. Note that the number of connection channels 30 is smaller than the number of first gas channels 43. In this embodiment, a plurality of first gas channels 43 and a plurality of second gas channels 44 are connected to each other by only one connection channel 30.

The connection member 3 is a porous member, for example. Also, the connection member 3 includes a compact layer 31 constituting the outer surface thereof. The compact layer 31 is more compact than the main body of the connection member 3. For example, the compact layer 31 has a porosity of about 0% to 7%. This compact layer 31 may be made of the same material as the connection member 3, a material used in the above-described electrolyte 7, crystallized glass, or the like.

Arrangement Relationship

The support substrate 4 has the first end surface 411 on the first end portion 41 side and a second end surface 421 on the second end portion 42 side. The first end surface 411 is an end surface facing the manifold 2 side and the second end surface 421 is an end surface facing away from the first end surface 411. In FIG. 4, the first end surface 411 is a lower end surface and the second end surface 421 is an upper end surface.

A ratio (p0/L) of the pitch p0 of the first gas channel 43 and the second gas channel 44 that are adjacent to each other to a distance L between the first end surface 411 and the power generation element portion 5 is 3.3 or less. Also, the ratio (p0/L) of the pitch p0 to the distance L is 0.02 or more. Note that, specifically, the distance L between the first end surface 411 and the power generation element portion 5 refers to the distance between the first end surface 411 and the power generation element portion 5, which is located closest to the first end surface 411, of a plurality of the power generation element portions 5. If the power generation element portions 5 are disposed on both the first main surface 45 and the second main surface 46, for example, the distance L between the first end surface 411 and the power generation element portion 5 refers to the distance between the first end surface 411 and the power generation element portion 5 that is located closest to the first end surface 411, out of all the power generation element portions 5 that are disposed on the first main surface 45 or the second main surface 46.

Figure 6:
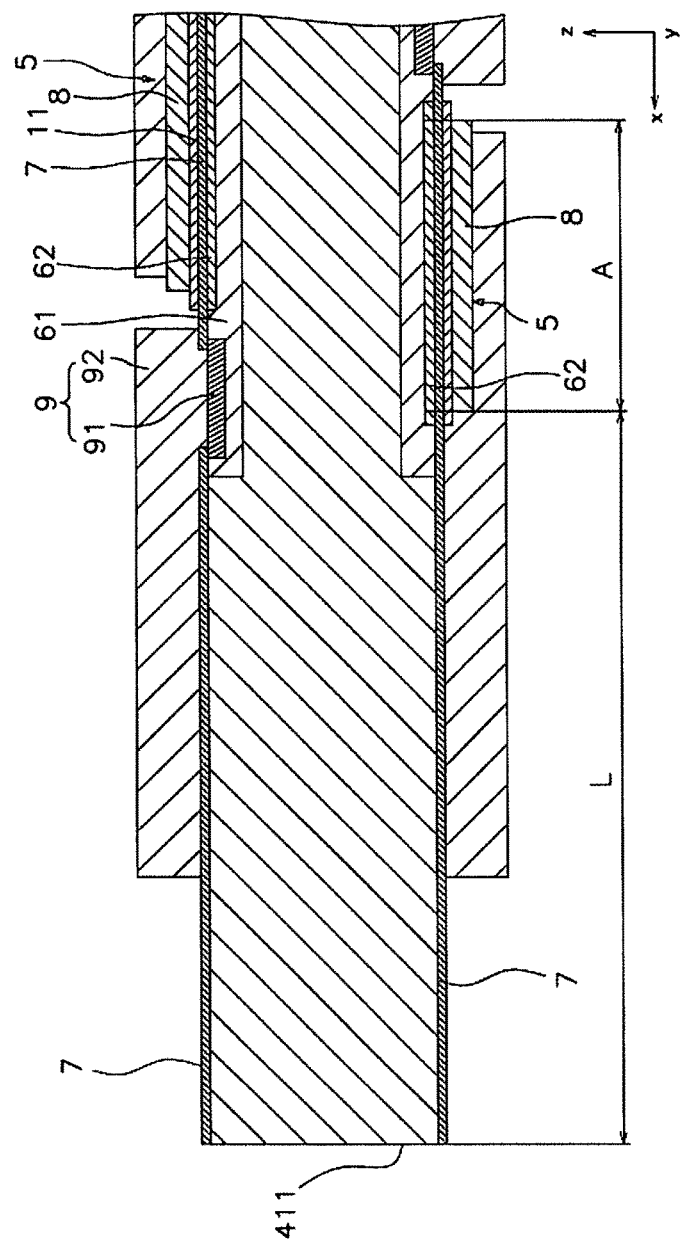
FIG. 6 is a cross-sectional view of a fuel cell in a lower end portion.

Also, as shown in FIG. 6, when the distance L between the first end surface 411 and a power generation element portion 5 is measured, the power generation element portion 5 refers to an active region A where an air electrode 8 overlaps a fuel electrode active portion 62 in a front view (the Z-axis view) of the fuel cell 10. That is, "the distance L between the first end surface 411 and the power generation element portion 5" refers to the distance from the first end surface 411 to the active region A. Note that in the example shown in FIG. 6 in this embodiment, the air electrode 8 is smaller than the fuel electrode active portion 62 and, thus, the distance L between the first end surface 411 and the power generation element portion 5 can be the distance from the first end surface 411 to the air electrode 8. This distance L can be measured by cutting the fuel cell 10 along the XZ plane passing through the center between the first gas channel 43 and the second gas channel 44 that are adjacent to each other, for example.

As a result of setting the ratio (p0/L) of the pitch p0 to the distance L to 3.3 or less in this manner, as indicated by the arrow G shown in FIG. 4, gas can flow in the support substrate 4 from the first gas channel 43 toward the second gas channel 44. That is, gas can flow in the support substrate 4 from the first gas channel 43 toward the second gas channel 44 in an inactive region extending from the first end surface 411 to the active region A. Also, as a result of setting the ratio (p0/L) of the pitch p0 to the distance L to 0.02 or more, a decrease in power generation efficiency can be inhibited.

Also, the pitch p0 is configured to be larger than a distance T between the first gas channel 43 and the power generation element portion 5. With this configuration, fuel gas that has flowed through the first gas channels 43 and has reached a power generation element portion 5 is more preferentially utilized in the power generation element portion 5 than the gas flowing from the first gas channels 43 to the second gas channels 44 and, thus, the power generation efficiency can be improved. Note that, as shown in FIG. 5, the distance T between the first gas channel 43 and the power generation element portion 5 refers to the distance from a first gas channel 43 to a fuel electrode active portion 62.

Method for Generating Power

In the cell stack device 100 configured as described above, a fuel gas, such as hydrogen gas, is supplied to the gas supply chamber 21 of the manifold 2 and the fuel cells 10 are exposed to a gas containing oxygen, such as air. Then, a chemical reaction indicated by Equation (1) below occurs in the air electrode 8, a chemical reaction indicated by Equation (2) occurs in the fuel electrode 6, and a current flows.

$$(1/2)\cdot O_2 + 2e^- \rightarrow O^{2-} \qquad (1)$$

$$H_2 + O^{2-} \rightarrow H_2O + 2e^- \qquad (2)$$

Specifically, fuel gas supplied to the gas supply chamber 21 flows through the first gas channels 43 of the fuel cells 10 and the chemical reaction indicated by Equation (2) above occurs in the fuel electrodes 6 of the power generation element portions 5. Unreacted fuel gas in the fuel electrodes 6 leaves the first gas channels 43 and is supplied to the second gas channels 44 via the connection channel 30 of the connection member 3. Then, fuel gas supplied to the second gas channels 44 undergoes the chemical reaction indicated by Equation (2) above in the fuel electrodes 6 again. Unreacted fuel gas in the fuel electrodes 6 in a process in which fuel gas flows through the second gas channels 44 is collected in the gas collection chamber 22 of the manifold 2.

As described above, the fuel gas supplied to the gas supply chamber 21 basically flows in the order of the first gas channels 43, the connection channel 30, and the second gas channels 44. On the other hand, as indicated by the arrow G, a portion of the fuel gas flowing through the first gas channel 43 flows inside the support substrate 4 in a portion thereof that is farther toward the first end portion 41 side than the power generation element portion 5 is, from the first gas channel 43 toward the second gas channel 44. Then, the portion of fuel gas is sent from the second gas channel 44 to the gas collection chamber 22. This unreacted fuel gas is collected from the gas collection chamber 22, and is burned with use of a gas burner, for example. Thus, even if the cell stack device 100 instantaneously has a fuel utilization rate of 100%, it is possible to inhibit flame failure of a gas burner.

Variations

Although embodiments of the present invention have been described above, the present invention is not limited thereto, and various modifications can be made without departing from the spirit of the present invention.

Variation 1

Figure 7:
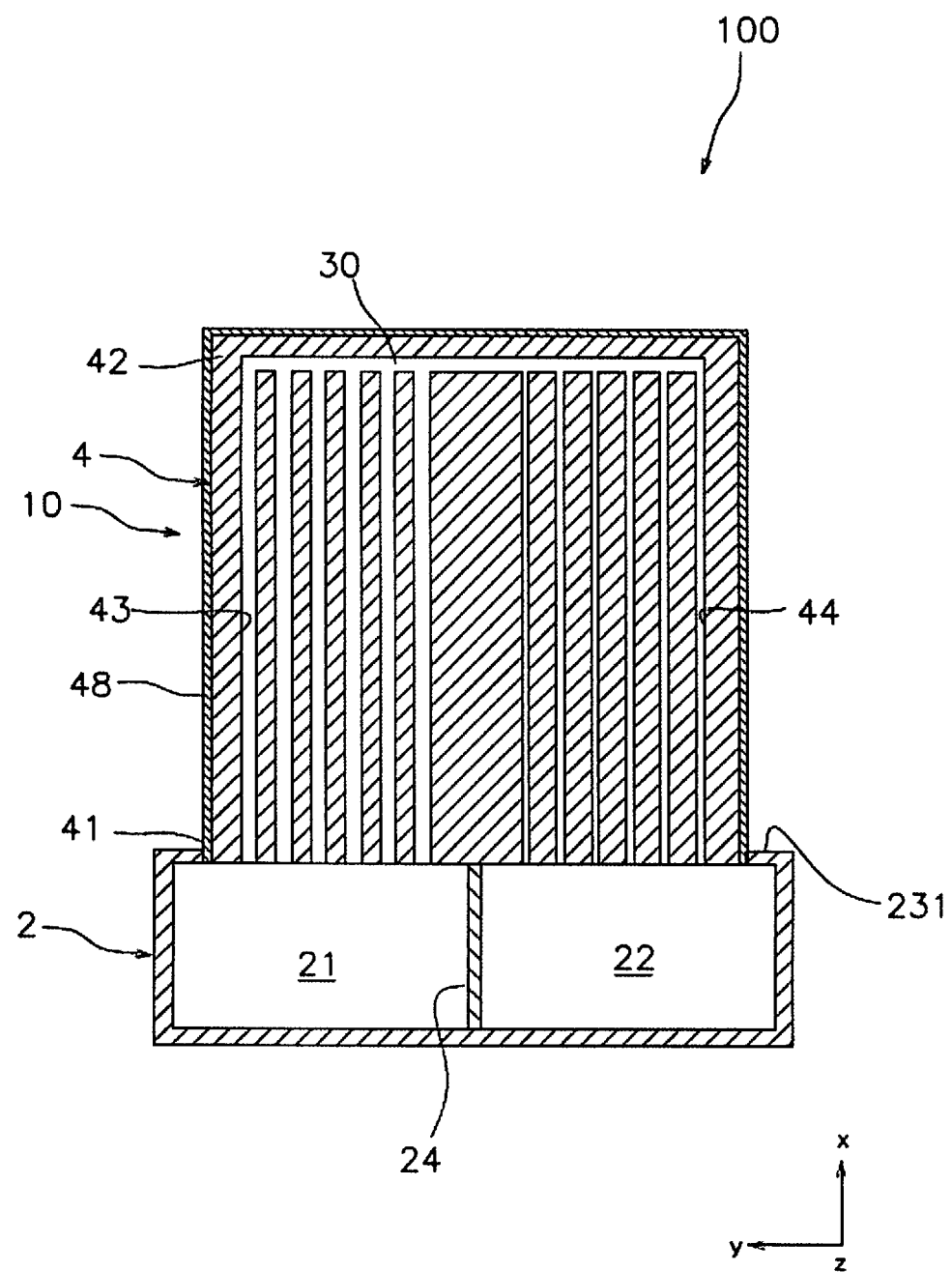
FIG. 7 is a cross-sectional view of a cell stack device according to a variation.

Although the first gas channels 43 and the second gas channels 44 are connected to each other by the connection channel 30 of the connection member 3 in the above-described embodiment, the configuration thereof is not limited thereto. For example, as shown in FIG. 7, the inner portion of the support substrate 4 may include the connection channel 30. In this case, the cell stack device 100 need not include the connection member 3. The first gas channels 43 and the second gas channels 44 are connected to each other by the connection channel 30 formed in the support substrate 4.

Variation 2

The first gas channels 43 may have different flow channel cross-sectional areas. Also, the second gas channels 44 may have different flow channel cross-sectional areas. Also, the flow channel cross-sectional area of the first gas channel 43 may be substantially the same as or smaller than the flow channel cross-sectional area of the second gas channel 44.

Variation 3

Figure 8:
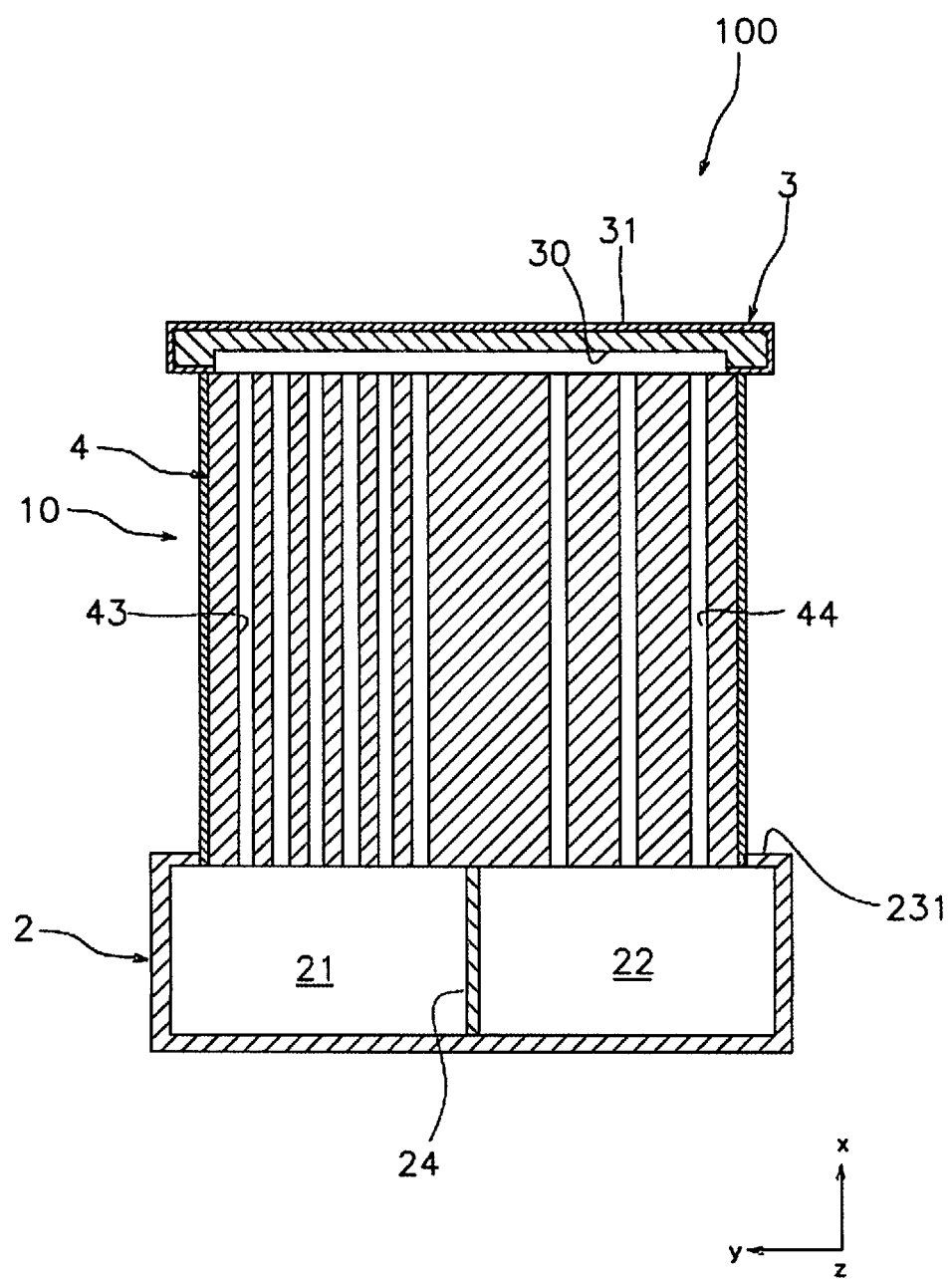
FIG. 8 is a cross-sectional view of a cell stack device according to a variation.

Although the number of second gas channels 44 is the same as the number of first gas channels 43 in the above-described embodiment, the number of second gas channels 44 is not limited thereto. For example, as shown in FIG. 8, the number of second gas channels 44 may be smaller than the number of first gas channels 43.

Variation 4

The first gas channel 43 need not have an even flow channel cross-sectional area in its length direction (the X-axis direction). In particular, the flow channel cross-sectional area of the first gas channel 43 may become smaller toward the second end portion 42 where the concentration of fuel gas is low. Also, the second gas channel 44 need not have an even flow channel cross-sectional area in the length direction (the X-axis direction). In particular, the flow channel cross-sectional area of the second gas channel 44 may become smaller toward the first end portion 41 where the concentration of fuel gas is low. This configuration makes it possible to keep Ni, whose diffusibility is increased and that is present in the vicinity of an interface, from changing into NiO.

Variation 5

Although the first and second gas channels 43 and 44 have a circular cross-section in the above-described embodiment, the cross-sectional shape of the first and second gas channels 43 and 44 may be a rectangle or an eclipse.

Variation 6

The support substrate 4 includes a plurality of first gas channels 43 in the above-described embodiment but may include only one first gas channel 43. Similarly, the support substrate 4 includes a plurality of second gas channels 44 but may include only one second gas channel 44.

Variation 7

Although the power generation element portions 5 disposed on the first main surface 45 are connected to each other in series in the above-described embodiment, it is not necessary for all the power generation element portions 5 disposed on the first main surface 45 to be connected to each other in series. Note that the same applies to the power generation element portions 5 disposed on the second main surface 46.

Variation 8

In the fuel cell 10, spaces between the power generation element portions 5 formed on the first main surface 45 and the power generation element portions 5 formed on the second main surface 46 need not be electrically connected to each other or may be electrically connected to each other at a plurality of portions.

Variation 9

The power generation, element portions 5 are disposed on both the first main surface 45 and the second main surface 46 in the above-described embodiment but may be disposed on only one of the first main surface 45 and the second main surface 46.

Variation 10

The fuel cells 10 may have different widths. Also, the power generation element portions 5 may have different widths. For example, the width of each power generation element portion 5 formed on a given support substrate 4 may be different from the width of each power generation element portion 5 formed on another support substrate 4.

Variation 11

Although the connection member 3 is a porous member in an embodiment, the connection member 3 may be constituted by metal. Specifically, the connection member 3 can be constituted by an Fe—Cr alloy, a Ni-based alloy, MgO-based ceramic material (may be the same material as the support substrate 4), or the like.

Variation 12

Figure 9:
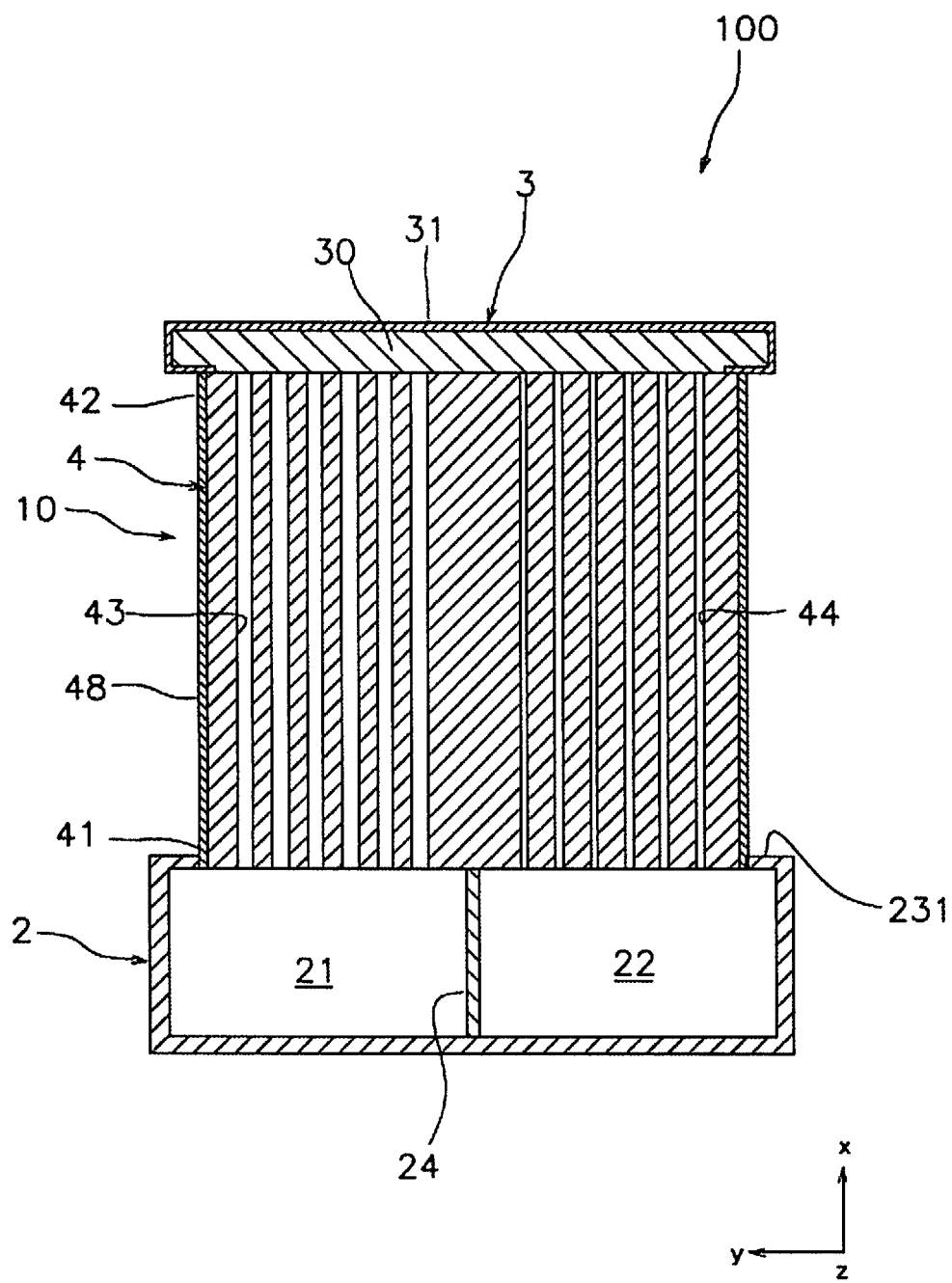
FIG. 9 is a cross-sectional view of a cell stack device according to a variation.

Although the connection channel 30 of the connection member 3 is constituted by a space in the above-described embodiment, the configuration of the connection channel 30 of the connection member 3 is not limited thereto. For example, as shown in FIG. 9, the connection channel 30 of the connection member 3 can be constituted by a plurality of pores formed in the connection member 3.

Variation 13

Although, the gas supply chamber 21 and the gas collection chamber 22 are defined in the manifold 2 of the above-described embodiment as a result of partitioning one manifold main body 23 with the use of the partition plate 24, the configuration of the manifold 2 is not limited thereto. For example, the manifold 2 can also be constituted by two manifold main bodies 23. In this case, one manifold main body 23 includes the gas supply chamber 21 and another manifold main body 23 includes the gas collection chamber 22.

Variation 14

Although the fuel cells 10 of the above-described embodiment are so-called horizontal-stripe type fuel cells in which the power generation element portions 5 are arranged in the length direction (the X-axis direction) of the support substrate 4, the configuration of the fuel cells 10 is not limited thereto. For example, the fuel cells 10 may be so-called vertical-stripe type fuel cells in which one power generation element portion 5 is supported on the first main surface 45 of the support substrate 4. In this case, one power generation element portion 5 may be or need not be supported on the second main surface 46 of the support substrate 4.

Variation 15

Although an electrochemical cell of the present invention is used as a solid oxide fuel cell (SOFC) in the above-described embodiment, there is no limitation thereto. For example, an electrochemical cell of the present invention can also be used as a solid oxide electrolysis cell (SOEC). If the electrochemical cell according to the present invention is used as a solid oxide electrolysis cell in this manner, it is possible to obtain effects such as the following, for example.

A solid oxide electrolysis cell 10 causes steam gas to flow in the order of the first gas channels 43 and the second gas channels 44 to produce hydrogen gas and oxygen gas. Here, produced hydrogen gas flowing through the second gas channels 44 flows in the support substrate 4 to the first gas channels 43 in a portion of the support substrate 4 that is farther toward the first end portion 41 side than the power generation element portion 5 is. As a result, hydrogen gas is mixed into steam gas that is to be supplied to the fuel electrode 6 of the power generation element portion 5 disposed on the first end portion 41 side and, thus, it is possible to inhibit the oxidation of nickel of the fuel electrode 6.

EXAMPLES

Hereinafter, the present invention will be more specifically described with the use of examples and comparative examples. Note that the present invention is not limited to the examples below.

Test A

A relationship between a ratio (p0/L) of the pitch p0 to the distance L and whether or not flame failure occurs was checked in a test A. First, cell stack devices 100 having a shape as shown in FIG. 4 and labeled as Sample No. 1 to Sample No. 16 were produced. Note that the number of fuel cells 10 was one in each cell stack device 100. The ratio (p0/L) of the pitch p0 to the distance L was changed in Samples No. 1 to 16. The fuel cell 10 in each cell stack device 100 had a height (the size in the X-axis direction) of 50 to 1000 mm, and a width (the size in the Y-axis direction) of 10 to 500 mm. Note that the thickness and the porosity of the support substrate 4 were set to be substantially equal to those of a support substrate that is normally used in a fuel cell (the thickness was about 1.5 to 5 mm, the porosity was about 20% to 60%). Note that, in the samples, configurations other than the ratio (p0/L) of the pitch p0 of the first gas channel 43 and the second gas channel 44 that are adjacent to each other to the distance L between the first end surface 411 and the power generation element portion 5 were basically the same.

Evaluation Method

In each cell stack device 100 produced as described above, hydrogen gas was supplied to the first gas channels 43 of the fuel cell 10 via the gas supply chamber 21 and the fuel cell 10 was exposed to air. Hydrogen gas was supplied at a supply pressure in a normal range (about 5 to 100 kPa) applied when hydrogen gas is supplied to a fuel cell. Off-gas that flowed in the order of the first gas channels 43, the connection channel 30, and the second gas channels 44 and was collected in the gas collection chamber 22 was then burned using a gas burner. Whether or not flame failure occurred was checked as a result of measuring the flame temperature of off-gas burned when a steady operation (operation having a fuel utilization rate of 80%) was changed to an operation having a fuel utilization rate of 100% through pulse change and the operation having a fuel utilization rate of 100% was continued for 0.5 seconds. Note that an operation having a fuel utilization rate of 100% refers to an operation in which all the hydrogen gas that has reached the power generation element portions is used to generate power in the fuel cell 10. Also, the amount of air supplied to the gas burner was set such that the air includes oxygen in an amount that is double the amount of oxygen with which hydrogen in off-gas ejected in an operation having a fuel utilization rate of 80% undergoes complete combustion. The flow rate of air was kept constant in the operation having a fuel utilization rate of 80% and the operation having a fuel utilization rate of 100%.

TABLE 1

| No. | p0 [mm] | L [mm] | p0/L | Flame Temperature [° C.] | Power Generation Efficiency |
| --- | --- | --- | --- | --- | --- |
| 1 | 0.5 | 45 | 0.011 | 760 | X |
| 2 | 0.8 | 45 | 0.018 | 755 | X |
| 3 | 0.8 | 40 | 0.020 | 750 | ◯ |
| 4 | 1 | 40 | 0.025 | 740 | ◯ |
| 5 | 1 | 30 | 0.03 | 735 | ◯ |
| 6 | 3 | 20 | 0.15 | 730 | ◯ |
| 7 | 5 | 20 | 0.25 | 720 | ◯ |
| 8 | 5 | 10 | 0.50 | 710 | ◯ |
| 9 | 5 | 5 | 1.0 | 690 | ◯ |
| 10 | 6.6 | 3 | 2.2 | 650 | ◯ |
| 11 | 7.5 | 3 | 2.5 | 635 | ◯ |
| 12 | 8 | 2.5 | 3.2 | 620 | ◯ |
| 13 | 6.6 | 2 | 3.3 | 610 | ◯ |
| 14 | 7 | 2 | 3.5 | — | ◯ |
| 15 | 7.5 | 2 | 3.8 | — | ◯ |
| 16 | 8 | 2 | 4.0 | — | ◯ |

As shown in Table 1, the flame temperatures of Samples No. 1 to 13 were kept at 600° C. or more, and no flame failure occurred. On the other hand, it is determined that, with Samples No. 14 to 16, flame failure occurred because it was difficult to measure the flame temperatures due to the flame temperatures continuing to decrease. According to the results described above, it was found that flame failure can be prevented as a result of setting the ratio (p0/L) of the pitch p0 to the distance L to 3.3 or less.

Test B

In a test B, the power generation efficiencies of Samples No. 1 to 16 produced in the test A were evaluated by measuring the voltages output in the operation having a fuel utilization rate of 80%. The results thereof are shown in Table 1. Note that the voltage output when p0/L was 1 in Table 1, that is, the voltage output from Sample No. 9, was used as a standard, and a sample whose output voltage decreased by 5% or more of the voltage output from Sample No. 9 was evaluated as "X", and a sample whose output voltage did not decrease by 5% or more thereof was evaluated as "O".

As shown in Table 1, it was found that Sample No. 1 and Sample No. 2 had low power generation efficiencies and Samples No. 3 to 16 had good power generation efficiencies. According to these results, it was found that, as a result of setting the ratio (p0/L) of the pitch p0 to the distance L to 0.020 or more as with Samples No. 3 to 16, a decrease in power generation efficiency can be inhibited.

The invention claimed is:

1. An electrochemical cell that is configured to be linked to a gas supply portion and a gas collection portion, the electrochemical cell comprising:
   a porous support substrate including a first end portion and a second end portion, the first end portion being configured to be linked to the gas supply portion and the gas collection portion, the second end portion being located opposite to the first end portion; and
   a power generation element portion disposed on a main surface of the porous support substrate,
   wherein the porous support substrate includes
      at least one first gas channel that extends from the first end portion toward the second end portion and is configured to be connected to the gas supply portion,
      at least one second gas channel that is connected to the first gas channel on the second end portion side, extends from the second end portion toward the first end portion, and is configured to be connected to the gas collection portion,
      only the porous support substrate is provided between the at least one first gas channel and the at least one second gas channel and
      a ratio p0/L of a pitch p0 of the first gas channel and the second gas channel that are adjacent to each other to a distance L between the power generation element portion and a first end surface of the support substrate located on the first end portion side is from 0.02-3.3.

2. The electrochemical cell according to claim 1, wherein the at least one first gas channel includes a plurality of the first gas channels, and
   the pitch p0 of a first gas channel and a second gas channel that are adjacent to each other is larger than a pitch p1 of first gas channels that are adjacent to each other.

3. The electrochemical cell according to claim 1, wherein the at least one second gas channel includes a plurality of the second gas channels, and
   the pitch p0 of a first gas channel and a second gas channel that are adjacent to each other is larger than a pitch p2 of second gas channels that are adjacent to each other.

4. The electrochemical cell according to claim 1, wherein the porous support substrate further includes a connection channel for connecting the at least one first gas channel and the at least one second gas channel in the second end portion.

5. The electrochemical cell according to claim 1, further comprising
   a connection member including a connection channel for connecting the at least one first gas channel and the at least one second gas channel, the connection member being attached to the second end portion of the porous support substrate.

6. The electrochemical cell according to claim 4, wherein the at least one first gas channel includes a plurality of first gas channels,
   the at least one second gas channel includes a plurality of second gas channels, and
   there is only one connection channel.

7. The electrochemical cell according to claim 5, wherein the at least one first gas channel includes a plurality of first gas channels,
   the at least one second gas channel includes a plurality of second gas channels, and
   there is only one connection channel.

8. The electrochemical cell according to claim 1, wherein the pitch p0 of a first gas channel and a second gas channel that are adjacent to each other is larger than a distance T between the first gas channel and the power generation element portion.

9. A cell stack device comprising:
   the electrochemical cell according to claim 1; and
   a manifold supporting the first end portion of the porous support substrate,
   wherein the manifold includes a gas supply chamber and a gas collection chamber, the gas supply chamber being connected to the at least one first gas channel, the gas collection chamber being connected to the at least one second gas channel.

* * * * *